C. W. BRADFORD.
ANTITHEFT DEVICE FOR CONTENTS OF GAS AND OTHER PIPE LINE SYSTEMS.
APPLICATION FILED JAN. 29, 1917.

1,239,870.

Patented Sept. 11, 1917.

Inventor:
Charles W. Bradford,
By *[signature]*
Attorney.

UNITED STATES PATENT OFFICE.

CHARLES W. BRADFORD, OF LOS ANGELES, CALIFORNIA.

ANTITHEFT DEVICE FOR CONTENTS OF GAS AND OTHER PIPE-LINE SYSTEMS.

1,239,870. Specification of Letters Patent. Patented Sept. 11, 1917.

Application filed January 29, 1917. Serial No. 145,288.

*To all whom it may concern:*

Be it known that I, CHARLES W. BRADFORD, a citizen of the United States, residing at Los Angeles, in the county of Los Angeles and State of California, have invented a new and useful Antitheft Device for Contents of Gas and other Pipe-Line Systems, of which the following is a specification.

My invention relates to improvements in devices employed in connection with pipe line systems for preventing their use by unauthorized persons; and the object of my improvement is to provide means for opening the pipe line in such a manner as to render it inoperative, and at the same time to make it very difficult, or impossible to close with the facilities that are ordinarily at the command of such persons.

This invention is especially useful in connection with the gasolene supply pipe of an automobile and, when properly employed for this purpose, will effectively prevent the unwarranted use or theft of the car under its own power. I have therefore selected this particular use for illustrative purposes, although there are other uses to which the invention may be applied equally well.

Figure 1:
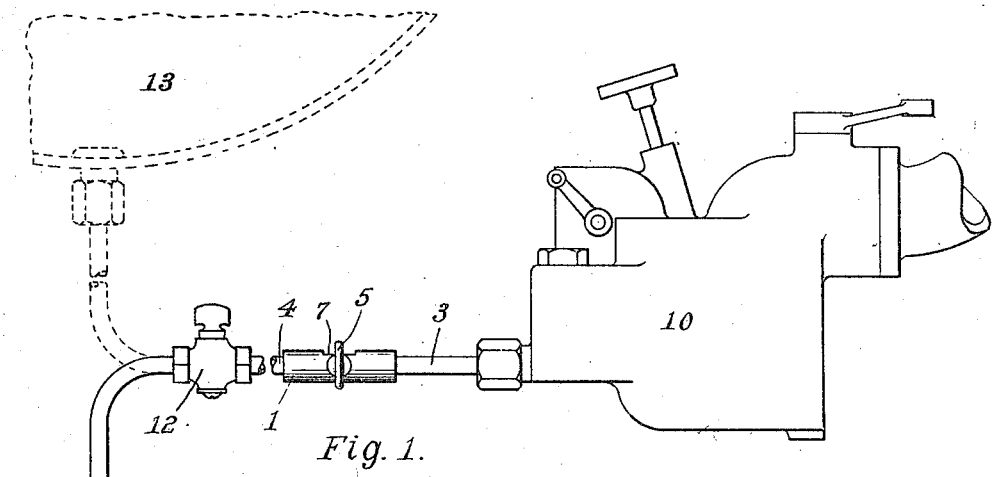
Figure 2:
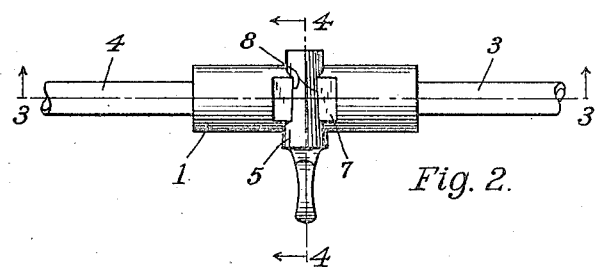
Figure 3:
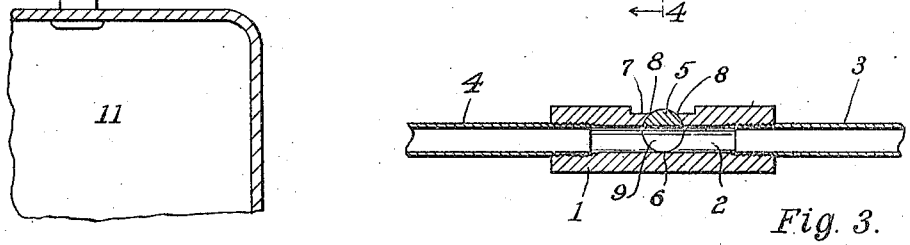
Figure 5:
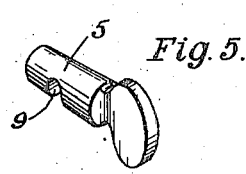
Figure 4:
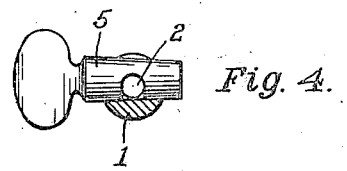
Figure 6:
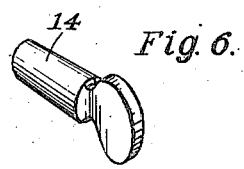

In the accompanying drawing, Figure 1 is an elevation of the device installed in the gasolene supply pipe of an automobile; Fig. 2 is a plan view of the same on an enlarged scale; Fig. 3 is a sectional elevation taken on the line 3—3 of Fig. 2, and looking in the direction indicated by the arrows; Fig. 4 is a sectional elevation taken on the line 4—4 of Fig. 2, looking in the direction of the arrows, and with the plug shown whole; Fig. 5 and Fig. 6 show, respectively, two forms of the plug employed in connection with the device.

Similar numerals refer to similar parts throughout the several views.

The invention is essentially a pipe connector or coupling of special form, and having a removable tapered plug fitted to it. The body part 1 has an axial passage 2 through it, and this passage is tapped at each end so that the gasolene supply pipes 3 and 4 may be screwed tightly into it. The pipe connections may, however, be made by means of gland nuts, or in any other suitable way desired.

The body 1 is provided with a transverse tapered bore, near its central portion, and into this the tapered plug 5 is fitted. The diameter of this bore, at its center, is greater than that of the passage 2, and its axis does not intersect that of the latter. On the contrary, the relative positions of these axes are such that the periphery of the tapered bore, at its center, is tangent or very nearly tangent to the periphery of the passage 2, as shown at 6.

The body 1 also has a depressed exterior surface 7 which intersects the tapered bore. By this means a gap 8 is created in this depressed surface. The plug 5 normally closes this gap but, when the plug is removed, the gap 8 as well as the two ends of the tapered bore communicate with interior passage 2, and all of these openings afford apportunity for the escape of the fluid conveyed by the pipe line.

Plug 5 is provided with a transverse notch 9 which registers with passage 2 when the plug is in place, and establishes communication between the two ends of the passage for the flow of the fluid.

Referring to Fig. 1, pipe 3 is connected to the carbureter 10, and pipe 4 is connected to the gasolene pressure tank 11, through the interposed stop cock 12. It is obvious that the device is equally as well adapted to the use of a gravity gasolene tank, as shown in dotted lines in Fig. 1 at 13. In either case, when the plug 5 has been removed, the gasolene supply pipe leading to the carbureter is opened to the atmosphere, and becomes inoperative. The insertion of the plug in a proper manner will immediately render it operative.

In the case of either gravity or pressure tanks it is necessary to shut off pipe 4 from the tank before removing plug 5, as otherwise gasolene will be wasted. For this purpose the cock 12 is closed. If, however, such a cock is not available, a plain tapered plug 14 may be used to take the place of plug 5, and this serves the same purpose as the cock.

In operation the motorist, when he wishes to protect his car, will close cock 12 and remove plug 5, or exchange plug 14 for plug 5 if no cock is available. The car can not then be used until the openings made in the pipe line by the removal of plug 5 are closed. This is very difficult to accomplish except by the use of a plug of exactly the same proportions. It might be possible to close the circular end openings of the tapered bore by means of wax or gum, but the gap 8 could hardly be stopped by these means. Any such material inserted in the gap, on account of its inwardly flaring sides, would drop down into passage 2. If therefore the gap 8 could be closed by the use of such material, the passage 2 would also become closed or clogged, and the pipe line would remain inoperative.

It is perfectly feasible, by the use of variations in the great number of possible combinations of degree of taper, diameter of plug, and position of the notch 9, to provide a plug that will properly fit only one body. The plugs and bores can also be made, if desired, in a great variety of shapes of prismatic section. All such variations are comprehended within the scope of my invention, together with variations in the attaching means, and in the body form.

Having thus fully described my invention, I claim:

1. In combination, a cylindrical body part having a longitudinal passage therethrough adapted for connection to a pipe line, said body being provided with a relatively larger transverse bore therethrough intersecting said passage, and with a depressed exterior surface substantially parallel to said bore and intersecting it intermediate its ends; and a removable plug adapted to fit within said bore and provided with a transverse channel therethrough to register with the said passage.

2. In combination, a body part having a passage therethrough adapted for connection to a pipe line, said body being provided with a relatively larger bore therethrough intersecting said passage, and with an exterior surface substantially parallel to said bore and intersecting it intermediate its ends; and a plug adapted to fit within said bore and provided with a channel therethrough to register with the said passage.

3. In combination, a body part having two intersecting passages therethrough, and an exterior surface substantially parallel to one of said passages and intersecting it intermediate its ends; and a plug adapted to fit within said last mentioned passage to close the opening made therein by said intersecting surface, said plug being provided with a transverse channel therethrough to register with the other said passage.

4. In combination, a body part having a longitudinal bore and a transverse intersecting bore therethrough, said body being provided with an exterior surface substantially parallel to and intersecting said transverse bore intermediate its ends; and a plug adapted to fit within said transverse bore to close the opening made by said intersecting surface and provided with a channel therethrough to register with the said longitudinal bore.

5. In combination, a pipe coupling having a longitudinal passage therethrough and a transverse bore intersecting said passage, and provided with an exterior surface substantially parallel with said transverse bore and intersecting it intermediate its ends; and a plug adapted to fit within said bore to close the gap formed by the intersection of said surface, said plug being provided with a transverse channel to register with said longitudinal passage.

CHARLES W. BRADFORD.

Copies of this patent may be obtained for five cents each, by addressing the "Commissioner of Patents, Washington, D. C."